United States Patent [19]

Biemans

[11] Patent Number: 5,345,249
[45] Date of Patent: Sep. 6, 1994

[54] PICTURE DISPLAY DEVICE

[75] Inventor: Anthony M. M. Biemans, Eindhoven, Netherlands

[73] Assignee: U.S. Philips Corporation, New York, N.Y.

[21] Appl. No.: 115,729

[22] Filed: Sep. 2, 1993

Related U.S. Application Data

[63] Continuation of Ser. No. 939,277, Sep. 2, 1992, abandoned.

[30] Foreign Application Priority Data

Sep. 3, 1991 [EP] European Pat. Off. ......... 91202247.2

[51] Int. Cl.⁵ .............................................. G09G 5/12
[52] U.S. Cl. .......................................... 345/1; 348/383
[58] Field of Search ................... 345/1, 189, 204, 903; 348/383; H04N 1/387, 1/393, 1/18, 1/20

[56] References Cited

U.S. PATENT DOCUMENTS

| | | | |
|---|---|---|---|
| 3,697,681 | 10/1972 | McCoy | 348/383 |
| 4,203,102 | 5/1980 | Hydes | 340/750 |
| 4,691,144 | 9/1987 | King et al. | 340/781 |
| 4,761,641 | 8/1988 | Schreiber | 340/717 |
| 4,924,318 | 5/1990 | Ho | 348/383 |

FOREIGN PATENT DOCUMENTS 0108541  5/1984  European Pat. Off. .

Primary Examiner—Richard Hjerpe
Attorney, Agent, or Firm—Edward W. Goodman

[57] ABSTRACT

In a picture display device having a plurality of adjacent display sections, vertically adjacent display sections are scanned in mutually opposite directions, so that at the transition between first and second rows of display sections, the perception of old picture information nicely fits in with the perception of old picture information, while at the transition between the second and third rows of display sections, the perception of new picture information nicely fits in with the perception of new picture information.

8 Claims, 1 Drawing Sheet t=20  t=0

— DISPLAY SECTION

PICTURE DISPLAY DEVICE

This is a continuation of application Ser. No. 07/939,277, filed on Sep. 2, 1992, now abandoned.

BACKGROUND OF THE INVENTION

1. Field of the Invention

The invention relates to a picture display device comprising picture memory means having read control means, and a plurality of adjacent display means for displaying adjacent sections of a picture stored in said picture memory means, each display means having a scanning device.

Such picture display devices having a plurality of adjacent display means which together show a total picture are known and are marketed by Philips under the registered trademark of "Vidiwall". It appears that disturbing effects occur at the transitions between the adjacent display means when moving objects are shown.

SUMMARY OF THE INVENTION

It is, inter alia, an object of the invention to provide a picture display device in which such disturbing effects are mitigated. For this purpose, one aspect of the invention provides a picture display device as defined in the opening paragraph, characterized in that said read control means includes means for reading first sections of said picture from said picture memory means in a first direction and adjacent sections of said picture from said picture memory means in an opposite direction, while said picture display device further comprises means for controlling said scanning devices to scan display means arranged for displaying said first sections in said first direction and to scan display means arranged for displaying said adjacent sections in said opposite direction.

Due to the characterizing features of the invention, viz. adjacent display means (sections) are scanned, in mutually opposite directions, it is avoided that at a border of one display section, old picture information is still perceived while at an adjacent border of an adjacent display section, already new picture information is perceived, so that on the occurrence of moving objects, a disturbing break-up of the perceived shape of the moving object occurs at the transitions between the adjacent display sections. This problem is solved because, in accordance with the invention, at the transitions between adjacent display sections, either the perception of old picture information neighbors the perception of old picture information, or the perception of new picture information neighbors the perception of new picture information, so that no disturbing break-up of the moving object at the transistions can occur.

It will be evident that the invention can be applied both to picture display devices composed of cathode ray tube display sections and to picture display devices composed of liquid crystal display sections. Also, the invention can be applied to picture display devices composed of horizontally scanned display sections, in which the display section is scanned by vertically succeeding horizontal lines, as well as to picture display devices composed of transposedly, i.e. vertically scanned display sections, in which the display section is scanned by horizontally succeeding vertical columns.

These and other (more detailed) aspects of the invention will be described and elucidated with reference to an example and the accompanying drawing.

DESCRIPTION OF THE PREFERRED EMBODIMENT

Figure 1A:
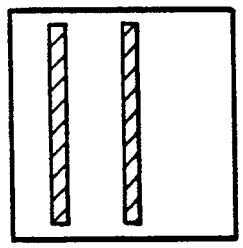
FIGS. 1A–1D illustrate how the perceived shape of moving objects is broken up at the transitions of adjacent display sections as occurs in prior art display devices.
Figure 1B:
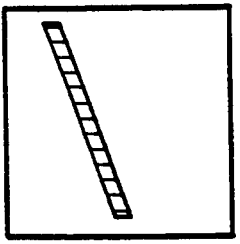

FIG. 1A shows a scene containing a moving black bar on a white background which at time $t=0$ ms, is at the right position and at $t=20$ ms, is at the left position. FIG. 1B shows how this scene is perceived on a television receiver having one single display: the bar is perceived slantingly. This perception can be explained as follows. At the top of the display, the new picture information is perceived during all of the 20 ms field period, so that the bar is perceived at its new position. At the bottom of the display, only in the last millisecond of the field period, the perception of old picture information is replaced by the perception of new picture information, so that the bar is perceived at its old position. In the middle of the display, during the first half of the field period, the old picture information is perceived while during the second half of the field period, the new picture information is perceived. Consequently, the human brain "sees" that part of the bar halfway between the old position and the new position. It can easily be imagined that in the same way at one quarter from the top of the display the bar is "seen" between the old and the new position at one quarter from the new position, and that at one quarter from the bottom the bar is "seen" between the old and the new position at one quarter from the old position.

Figure 1C:
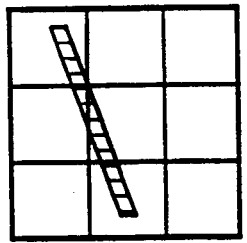
Figure 1D:
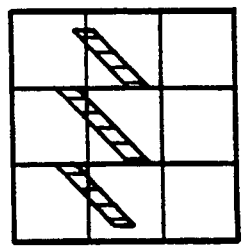

The above described effect is present, but not disturbing because the shape of the perceived bar is coherent. If a "Vidiwall"-screen, i.e. a picture display device having a plurality of adjacent display sections, displayed the bar as indicated in FIG. 1C, nobody would bother. However, because on each display section of the picture display device appears a slanting part of the bar is perceived which is at its new position at the top of each display section and which is at its old position at the bottom of each display section, the complete bar is perceived interruptedly as shown in FIG. 1D, which is very disturbing. The angle of the slants shown in FIG. 1D is even larger (worse) than the angle of the slants shown in FIG. 1B because the same horizontal displacement is now spread over only one third of the height.

Figure 2:
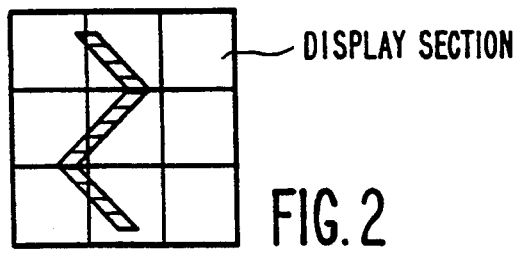
FIG. 2 illustrates the principles and advantages of the present invention.

FIG. 2 shows the result as is obtained by a picture display device which operates in accordance with the principles of the present invention. Herein, the vertical scanning of the middle row of picture display sections is not from the top to the bottom, as with the first and third rows, but from the bottom to the top. As a result thereof, at the transition between the first and second rows of display sections, the perception of old picture information nicely fits in with the perception of old picture information, while at the transition between the second and third rows of display sections, the perception of new picture information nicely fits in with the perception of new picture information. Consequently, all annoying interruptions in the perceived shape of the bar as shown in FIG. 1D are removed, while only a far less annoying zig-zag perception of the shape of the bar remains. It is to be noted that in the above example, the horizontal displacement of the bar is made very large to illustrate the problem clearly. However, also with smaller displacements, any discontinuity in the perceived shape of an object is very disturbing, while a zig-zag deformation of the perceived shape of the object is far less disturbing.

As will be appreciated by those skilled in the art, when transposed scanning is used, a similar problem occurs between horizontally adjacent blocks with vertical movements of horizontal bars, which problem can be solved by adapting the horizontal scanning of the even columns of display sections. It goes without saying that the problem is also solved by a picture display device in which instead of the scanning of all even rows (columns), the scanning of all odd rows (columns) is adapted.

Figure 3:
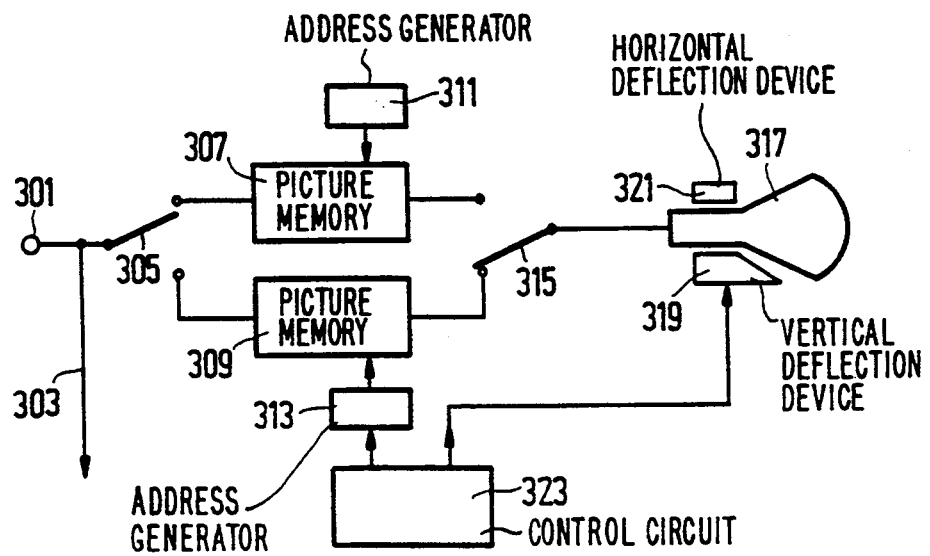
FIG. 3 shows an embodiment of a picture display device in accordance with the present invention.

FIG. 3 shows an embodiment of a picture display device in accordance with the present invention. A preferably sequential picture signal is applied to an input 301. The input 301 is coupled to a plurality of picture memory arrangements, each of which corresponds to one display section. One of these picture memory arrangements and its corresponding display section is shown in FIG. 3; a lead 303 connects the input 301 to the other picture memory arrangements and display sections. The input 301 is connected to a common contact of a switch 305 which has two switching contacts which are coupled to the picture memories 307, 309. All of the picture is written into picture memory 307 under the control of address generator 311, while that part of the picture which is to be displayed by the present display section is read from picture memory 309 under the control of address generator 313. Outputs of the field memories 307, 309 are coupled to switching contacts of a switch 315, the common contact of which is coupled to the display section 317. The display section 317 has a vertical deflection device 319 and a horizontal deflection device 321. The address generator 313 and the vertical deflection device 319 are controlled by a control circuit 323 which ensures that the pixels read from the memory are displayed at the correct position on the display section 317. After each field period the picture memories change their function; the switches 305 and 315 are in the positions not shown, the new field is written into picture memory 309 while the relevant section of the old field is read from the picture memory 307. For this purpose, the control circuit 323 now controls address generator 311 in the same manner as it controlled address generator 313 during the previous field period.

In accordance with the principles of the present invention, the control circuit 323 is arranged such that if the display section 317 belongs to a row of display devices whose vertical deflection is in a direction opposite to the usual direction, the read out from the picture memory and the vertical deflection of the display section 317 are adapted accordingly. After having read the present disclosure, those skilled in the art will be completely aware how to adapt the control circuit 323 if the display section 317 belongs to such an adapted row of display sections: the vertical deflection current furnished to the vertical deflection device 319 should be inverted, while the vertical address counter in the address generator should count downward from the vertical end address instead of counting upward from the vertical start address. When LCD display sections are used, the line counter of the LCD display section counts in the same direction as the address counter of the corresponding picture memory.

Of course, many alternatives to this embodiment can be conceived by those skilled in the art, and some of these alternatives have already been indicated above. Another alternative embodiment may comprise partial picture memories in which only that part of the picture is written which corresponds to the display section concerned. FIGS. 1 and 2 show a picture display screen having 3×3 display sections; it will be evident that the present invention can also be applied to other "Vidiwall" configurations having different arrangements of display sections, for example 2×2, 4×4, 5×5, or even asymmetric configurations like 4×6, etc.

What is claimed is:

1. A picture display system comprising picture memory means having read control means, and a plurality of adjacent display apparatuses for displaying, respectively, adjacent sections of a picture stored in said picture memory means, each display apparatus having a separate scanning device, characterized in that said read control means include means for reading first sections of said picture from said picture memory means in a first direction and adjacent sections of said picture from said picture memory means in an opposite direction, while said picture display system further comprises means for controlling said separate scanning devices to scan display apparatuses arranged for displaying said first sections in said first direction and to scan display apparatuses arranged for displaying said adjacent sections in said opposite direction.

2. A picture display system as claimed in claim 1, characterized in that said plurality of adjacent display apparatuses are arranged in an array having n rows and m columns, where n and m are integers.

3. A picture display system as claimed in claim 2, characterized in that n equals m.

4. A picture display system as claimed in claim 2, characterized in that n is greater than 1 and said first and adjacent sections of said picture are vertically displaced.

5. A picture display system as claimed in claim 4, characterized in that said first and opposite directions are vertically oriented.

6. A picture display system as claimed in claim 2, characterized in that m is greater than 1 and said first and adjacent sections of said picture are horizontally displaced.

7. A picture display system as claimed in claim 6, characterized in that said first and opposite directions are horizontally oriented.

8. A picture display system as claimed in claim 1, characterized in that said picture memory means comprises a first and a second picture memory for each of said plurality of adjacent display apparatuses, and said read control means comprises reading means for each of said plurality of adjacent display apparatuses.

* * * * *